J. WILKINS.
Apparatus for Saving Float Gold.
No. 224,368.          Patented Feb. 10, 1880.
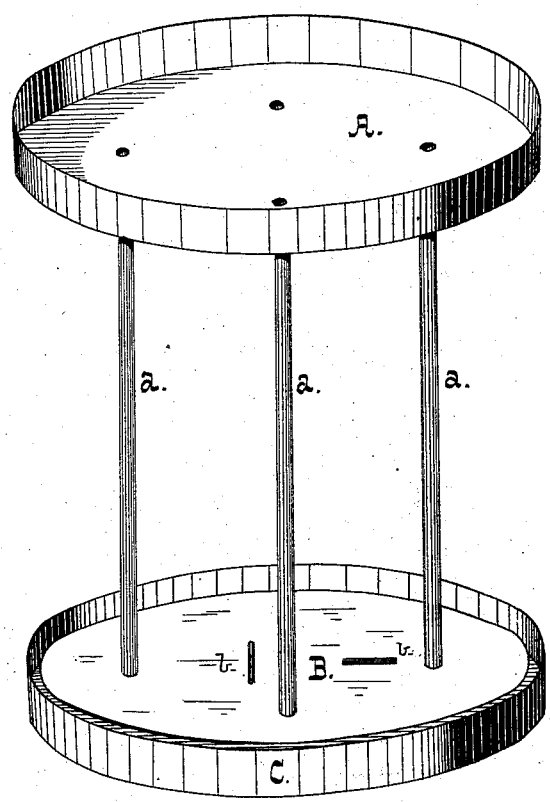
Witnesses,
H. S. Hyland.
DcL. H. Barclay.
Inventor,
JOSEPH WILKINS
by
R. D. Williams.
Attorney.

UNITED STATES PATENT OFFICE.

JOSEPH WILKINS, OF BALTIMORE, MARYLAND.

APPARATUS FOR SAVING FLOAT-GOLD.

SPECIFICATION forming part of Letters Patent No. 224,368, dated February 10, 1880.

Application filed November 24, 1879.

*To all whom it may concern:*

Be it known that I, JOSEPH WILKINS, of Baltimore, State of Maryland, have invented certain new and useful Improvements in Apparatus for Saving Float-Gold; and I hereby declare the same to be fully, clearly, and exactly described as follows, reference being had to the accompanying drawing, in which is illustrated, in perspective, the device employed by me and constituting my invention.

It is well known that the actual product of metal in metallurgical operations on a commercial scale falls far short of the theoretical return, as shown by analysis or assay, and this loss in the case of gold-mining is probably heavier than in the treatment of any other metal.

The sediment which falls from the water flowing from the stamps and from the waste-water in hydraulic mining is rich in gold; but all attempts to reclaim and recover this so-called "float-gold" have heretofore failed of being practically remunerative. Inasmuch as the amount of gold suspended in the water bears such a small proportion to the total amount of suspended matter, it would not pay to treat the latter by amalgamation, even were a system of filtration or other separation of the suspended matter from the water feasible.

The separation of the gold by amalgamation while suspended in the water has not heretofore been practicable by reason of the obstacles in the way of bringing the water into intimate mixture or contact with mercury. These obstacles I have overcome by means of the simple apparatus illustrated in the accompanying drawing, in which—

A is a pan, constructed of any suitable material, from the bottom of which lead pipes *a a a a*, the lower ends of which are secured to a disk, B, having perforations opposite the ends of the pipes. C is a second pan beneath the disk B.

In operation, the water to be treated is led into a tank, wherein the sand and heavier particles of dirt and impurities are allowed to subside. The float-gold, which is all that its name implies, as it remains suspended for an almost indefinite period, remains in the water, which, when reasonably free from impurities, is led into the pan A. Previous to this the pan C has been nearly filled with mercury, the disk B, which is maintained truly horizontal, as shown, by a pair of levels, *b b*, being immersed to the depth of, say, three or four inches, whereby an upward pressure of about two pounds to the inch is secured on its lower face.

The pipes *a* are made of a length to admit of the downward flow of the water—say from eighteen to twenty times the mercuric head—the specific gravities of water and mercury being to each other respectively about as 1 to 14.

The water from the pan A flows downward through the pipes *a* and out under the disk B. Instead of assuming the form of spherical masses and bubbling swiftly to the surface, as it would do were the pipes simply immersed in the mercury without the disk, the water spreads itself into a thin sheet under the disk, whereby every part of it is brought into contact with mercury and any suspended gold is amalgamated and retained.

The water flowing from the pan C may be led into the upper pan, A, of a second amalgamator, and thence to a third.

The gold is reclaimed from the mercury by the usual methods of squeezing the mass of mercury through fine cloth and distilling the residual mercury from the pasty mass. With careful management there is little or no waste of mercury.

The device is simple and inexpensive, being conveniently formed by screwing one end of a piece of gas-pipe into the bottom of a tub and the other into a disk, and immersing the latter in a body of mercury contained in a second tub.

The device requires no care or attention except to remove the saturated mercury and supply fresh, and its use results in a nearly complete recovery of gold, which has by the processes in use heretofore been wholly lost.

I am aware that it is old to force auriferous material through mercury, a screw-conveyer or equivalent mechanism being used to drive the material through a pipe whose lower end is immersed in a mass of mercury, and to such I lay no claim; and I am also aware that flanged revolving disks immersed in mercury and stationary perforated disks similarly immersed have been used in recovering gold from auriferous water, and such I do not claim; but What I do claim is—

1. In an apparatus for saving float-gold by amalgamation, an elevated tank or receiver, in combination with one or more pipes leading therefrom and terminating in a flangeless imperforate stationary horizontal disk, as set forth.

2. In combination with the pipes $a$ and flangeless imperforate stationary disk B, the tanks A and C, as and for the purpose described.

JOS. WILKINS.

Witnesses:
R. D. WILLIAMS,
JOHN C. GITTINGER.